United States Patent
Gauthier et al.

[11] Patent Number: 6,030,421
[45] Date of Patent: Feb. 29, 2000

[54] ULTRA THIN SOLID STATE LITHIUM BATTERIES AND PROCESS OF PREPARING SAME

[75] Inventors: Michel Gauthier, La Prairie; Ginette Lessard, Longueuil; Guy Vassort, Longueuil; Patrick Bouchard, Longueuil; Alain Vallée, Varennes; Michel Perrier, Montréal, all of Canada

[73] Assignee: Hydro-Quebec, Montreal, Canada

[21] Appl. No.: 09/064,821

[22] Filed: Apr. 23, 1998

[30] Foreign Application Priority Data

Apr. 23, 1997 [CA] Canada ................................... 2203490
Apr. 28, 1997 [CA] Canada ................................... 2203869

[51] Int. Cl.$^7$ ............................. H01M 6/16; H01M 6/00
[52] U.S. Cl. ......................................... 29/623.1; 29/623.3
[58] Field of Search ............................. 29/623.1, 623.3; 429/191; 427/289; 264/104

[56] References Cited

U.S. PATENT DOCUMENTS

| | | | |
|---|---|---|---|
| 4,177,330 | 12/1979 | Gordon et al. ........................... | 429/152 |
| 5,250,784 | 10/1993 | Muller et al. ....................... | 219/121.72 |
| 5,350,645 | 9/1994 | Lake et al. .............................. | 429/124 |
| 5,378,557 | 1/1995 | Murata et al. .......................... | 429/127 |
| 5,423,974 | 6/1995 | St-Amant et al. ........................ | 205/50 |
| 5,547,780 | 8/1996 | Kagawa et al. ......................... | 429/149 |

*Primary Examiner*—Mark Kopec
*Attorney, Agent, or Firm*—Oblon, Spivak, McClelland, Maier & Neustadt, P.C.

[57] ABSTRACT

There is provided a mother-battery containing at least the following films: an anode of metallic lithium or sodium, a polymer electrolyte which is conductive towards the alkaline ions of the anode and also acts as a separator between the electrodes, and a composite cathode consisting of a compound which is reducible to lithium or sodium, an additive of electronic conduction and a polymer electrolyte binder. The mother battery also includes an electronically conductive thin coating on the external face of the anode and, possibly of the cathode, in which the conductive material is chemically inert towards the electrode material and which also serves to establish permanent electrical contacts on the external faces. The laminated mother-battery of larger surface area and at least partially charged is thereafter subjected to a sharp mechanical cutting out to give thin polymer electrolyte batteries with lithium or sodium anode. The thus cut out batteries preserve substantially their voltage after mechanical cutting out which is recovered by a mechanism of self-healing.

49 Claims, 9 Drawing Sheets

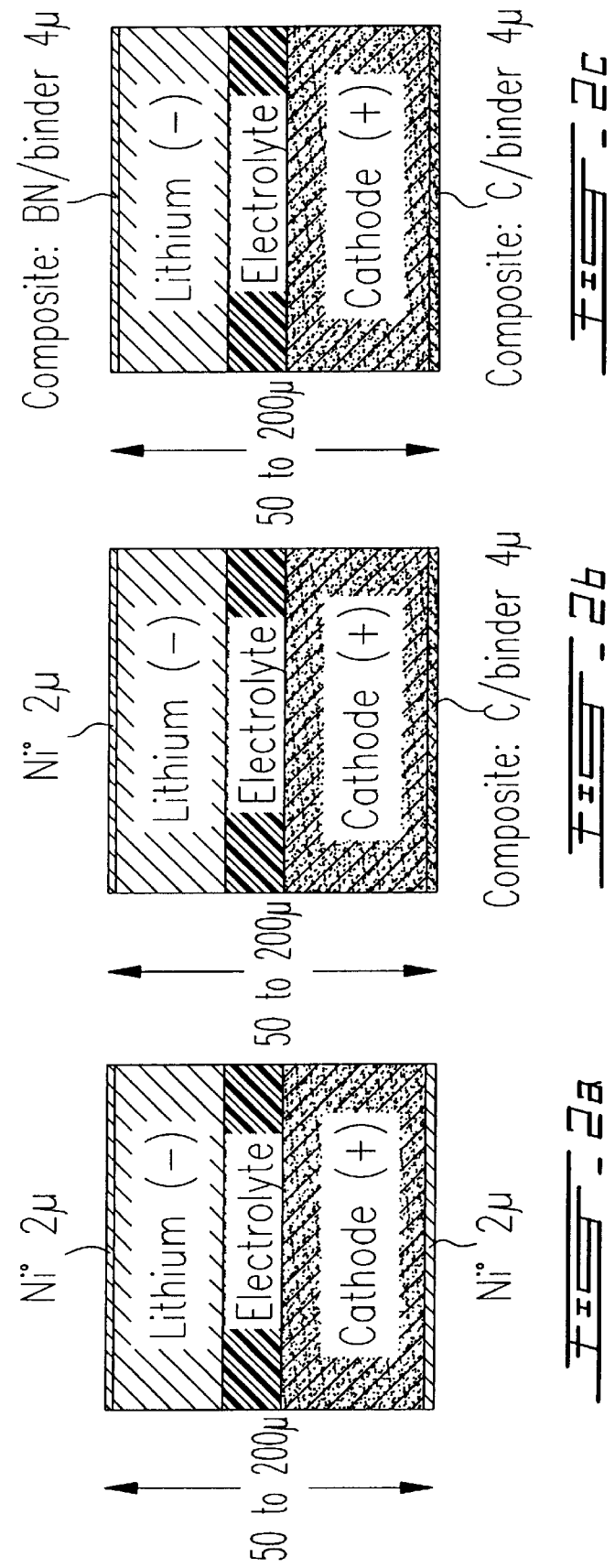

Thermo-adhesive plastic

Aluminum

6,030,421

ULTRA THIN SOLID STATE LITHIUM BATTERIES AND PROCESS OF PREPARING SAME

BACKGROUND OF INVENTION (a) Field of the Invention

The present invention concerns ultra thin solid state batteries and their process of preparation. More generally, the invention relates to a process for the preparation of thin polymer electrolyte batteries with lithium or sodium anode, as well as to batteries obtained by this process. More particularly, the invention relates to the preparation of polymer electrolyte batteries, from a laminated mother-battery which is sharply and mechanically cut out. In other words, the present invention concerns the use of a laminated battery of large surface area which is prepared by continuous processes, in which the design is particularly adapted to the manufacture of smaller elements by simple direct cutting out of the laminated product, as well as the process of manufacturing small ultra thin batteries by mechanical cutting out.

(b) Description of Prior Art

During the last ten years primary and recharge able lithium type batteries were the object of considerable research and development. The aim is to develop a low cost battery, with a large energy content and good electrical performances. With this in view, a large number of battery designs have been developed to comply with different applications such as micro-electronics, telecommunications, portable computers and electrical vehicles, to name only a few.

Electrochemical batteries or generators, whether rechargeable or not, are all made of an anode which may consist of a metal such as lithium, a cathode which consists of an insertion compound, reversibly alkali ions reversibly or non reversibly inserting alkaline ions, such as vanadium oxide or manganese dioxide, a mechanical separator placed between the electrodes, and an electrolytic component. The term electrolytic component means any material comprised within the generator which is used for ionic transport, except the active materials of the electrode, in which the ions $Li^+$ may move, at the level of the separator as well as in the composite electrode. During discharge or charge of the generator, the electrolytic component ensures the transport of the ionic species through the entire generator, from one electrode to the other and even inside the composite electrode. In a polymer electrolyte battery, the functions of separator and of electrolytic components are generally combined in the same material.

Small, rechargeable or non rechargeable lithium batteries, such as button batteries and flat batteries are generally manufactured by elaboration and cutting out of individual components which are thereafter assembled In certain cases dealing with flat batteries consisting of thin films, the batteries or their components are elaborated in the form of batteries or multiple elements of predetermined dimension which are thereafter cut out in electrochemically inactive zones which are provided for this purpose so as to enable local cut out without damages for the electrochemical device. Examples of batteries utilizing this manufacturing process are describes in U.S. Pat. Nos, 4,177,330; 5,378,557 and 5,547,780.

In most cases, the active electrodes: metallic lithium and composite cathode, are directly in contact with the wrapping material which is then used as protection barrier and current collector; often these electrodes are directly prepared on the wrapping material by coating or pressing. This combination of two functions: barrier and collector on the same material, then enables to optimize the weight and the volume of the complete battery.

This procedure however has many disadvantages:

- the need to predetermine the dimensions and the position of the elements or the batteries during the manufacture of multiple elements to be cut out;
- losses in material and in optimization associated with the protrusions and prepositioning required by the operations of cutting out and sealing of the whole of the device;
- problems associated with the positioning of the elements over one another during assembly or cutting out;
- the excess thickness required in order that the same material may be used as air and water impervious barrier as well as collector.

This excess thickness becomes particularly penalizing for batteries consisting of thin films mounted in series or parallel assemblies, i.e. when a plurality of individual batteries are superposed to develop the required voltage or amperage.

The mechanical cutting out of a polymer electrolyte battery into pieces is possible a priori, however it is generally understood that the operation of cutting out produces short circuits and leaves weak points especially when this operation is carried out with mechanical means (U.S. Pat. No. 5,250,784), which is indirectly confirmed by more complex processes of cutting out multiple batteries (U.S. Pat. Nos. 5,378,557 and 5,547,780) where cutting out is effected in non-electrochemically active predetermined zones. Many times, the inventors have carried out a mechanical cutting out of a laminated battery into thin films, by means, for example of a pair of scissors without permanent loss of the voltage of the pieces. However, these tests carried out under ambient air could not suggest a manufacturing process, since, on the one hand, the tests were based on the irreversible oxidation of lithium with water and the components of air, and on the other hand, because it is known that the mechanical cutting out itself creates zones which are favorable to the development of short circuits, for example during cycling, as a results of the mechanical cutting out which tends to draw the collectors of the anode and the cathode together.

The invention has for object the manufacture of polymer electrolyte batteries with lithium or sodium anode utilizing a surprising self-healing effect of the anode, and which facilitates the cutting out into small elements with no or little reject.

It is also an object of the invention to provide a process of cutting out a laminated mother-battery which leaves no electrochemically weak points as illustrated from an electrochemical cycling of batteries cut out according to the invention.

Another object of the invention is to provide a process of manufacturing batteries which, in a non limiting manner, relies on the chemical or electrochemical dissolution of metallic lithium or sodium when in contact with the material of the cathode so as to rationalize the self-healing mechanism.

It is another object of the invention to establish through examples that there is a mechanism of self-healing which tends to prevent short-circuits often caused by mechanical cutting out and this, even in the absence of air and water.

It is another object of the invention to establish through tests of cycling that the phenomenon of self-healing tends to eliminate lithium from the cut out zones.

Another object of the invention resides in the design of a simplified process of manufacture which is based on the sharp cutting out of a battery of large surface area prepared by continuous processes, without having in to presume in advance of the shape or the dimension of the battery to be produced.

SUMMARY OF INVENTION

The invention concerns a process of preparing thin gelled or non gelled polymer electrolyte batteries, with lithium or sodium base anode, from a laminated mother-battery of large surface area containing a lithium or sodium base anode sheet, a polymer electrolyte as well as a cathode in the form of a thin film, characterized in that the cathode has the property of dissolving lithium or sodium, and the mother-battery is subject to a sharp mechanical cut out in a manner to involve a phenomenon of self-healing which preferably results from a chemical dissolution in the cathode of all lithium or sodium having been in contact with the cathode during the cutting out operation.

Preferably, the anode is based on metallic lithium. On the other hand, it is preferred that the polymer electrolyte be conductive towards alkaline ions of the anode and that it also acts as separator between the anode and the cathode.

According to another embodiment, the mother-battery includes a composite cathode consisting of a compound which is reducible to lithium or sodium, an additive of electronic conduction and a polymer electrolyte binder. Moreover, there may be provided a thin electronically conductive coating on the external face of the anode and possibly of the cathode, in which the conductive material is chemically and electrochemically inert towards the electrode material and also serves to establish permanent electrical contacts on the external faces of the cut out batteries. The thickness of the conductive coating of the anode and possibly of the cathode is preferably lower than 5 micrometers so as to minimize weight and volume and to preserve the flexibility of the thin battery as a whole.

The conductive coating is for example a thin nickel or iron base metallic sheet as described in U.S. Pat. No. 5,423,974. It may also be made of a composite including an inert polymer binder and an electronically conductive dispersed charge which is inert with respect to the material of the electrode. With respect to the conductive charge, the latter may be a conductive powder which is inert towards lithium, and comprises, in a non limited manner, metallic nitrides, carbides and borides in the case of the anode, or it may also comprise carbon in the case of the conductive coating of the cathode. The inert polymer binder is a non ionic conductor and may comprise, in a non limited manner, ethylene and propylene monomer units, for example the polymer binder is selected from polyethylene, polypropylene or ethylene propylene diene (EPDM) copolymer. The inert binder may also comprise other organic binders based on cross-linkable prepolymers and/or fictional monomers which are easy to use. By way of non-limiting example, acrylates, methacrylates, allyls, vinyls or a combination thereof may be mentioned. In the case of the cathode, the inert polymer binder may also comprise fluorinated units, such as vinyldiene fluoride (PVDF) or vinyldiene-co-hexafluoropropene copolymer (PVDF- HFP). The choice of inert binder is based firstly on its compatibility with the active materials of the corresponding electrode.

In certain cases, the inert polymer binder is an adhesive, such as a thermo-adhesive, so as to facilitate the positioning of the batteries and the quality of the electrical contacts.

The composite conductive coating should possess surface resistance, which varies between 0.1 and 1000 $\Omega/cm^2$, preferably between 1 and 300 $\Omega/cm^2$ so as to limit a short-circuit current during the operation of cutting out, to maintain a state of charge and for the security of the cutting out operations.

According to another embodiment, the mother-battery is obtained from continuous films of anode, cathode and polymer electrolyte, which are assembled by means of processes of coating and transfer of films, these films adhering to one another. If necessary, cross-linking steps are used before or after coating or transferring the films.

Once the batteries have been obtained, they may be piled in parallel or in series, or they may be piled after folding in zigzag. Individual thin batteries or thin batteries piled in parallel or in series, may also be placed in a wrapping consisting of a single case.

According to another embodiment of the invention, the laminated mother-battery includes a peelable support film on at least one of its faces so as to facilitate its production and handling. This peelable support film mainly consists preferably and in a non limiting manner, of polypropylene or polyethylene, and it is removed just before the operation of cutting out the batteries.

The polymer electrolyte of the separator and if necessary of the electrode consists for example of molecular weight higher than 50,000 so as to obtain films which can be handled and transferred by continuous laminating processes. A gelled polymer electrolyte may also be used so as to optimize ionic conductivity at ambient temperature. Gelled polymer means a polymer matrix which is capable of incorporating a polar aprotic organic solvent in order to constitute a gel.

According to another embodiment, the polymer electrolyte consists of a polymer matrix and the latter is made conductive by adding at least one polar aprotic solvent and one alkali metal soluble salt in the electrolyte. This addition of a polar aprotic liquid solvent may be carried out after the operation of cutting out so as to minimize short-circuit current during the operation of cutting out. The same is true with respect to the alkaline salt which is preferably added after the operation of cutting out so as to minimize short-circuit current. During the cutting out operation, it is also possible to cool the battery at a temperature lower that the glass transition temperature of the electrolyte so as to reduce ionic conductivity.

The addition of polar aprotic solvents or salt or both after assembling the battery may be facilitated by the use of at least one permeable composite conductive coating in order to facilitate their introduction.

The operation of cutting out may be carried out mechanically by means of blanking, crush cutting or score cutting tools or the cutting out operation may be carried out with a tool made at least in part of an insulating material so as to minimize short-circuit during cutting out. The cutting out operation may also be carried out in the presence of a lubricant which is inert or reactive towards lithium During or after the cutting out operation, it is possible to carry out a chemical reaction of lithium or sodium present at the cut out edge so as to eliminate any short-circuit and to neutralize lateral electrochemical activity. This operation facilitates the phenomenon of self-healing mentioned in this invention. The chemical reaction is normally carried in tide presence of reactants which are capable of oxidizing lithium present at the edge, and which are liquids or gases, such as air, capable of forming an electrically insulating compound of lithium which is insoluble in the polymer electrolyte and may also consolidate the edge. The compound formed is for example based on carbonates, oxyanions, oxides, chalcogenides, fluorine derivatives or alcoholates.

Another way of consolidating the edges of the battery, for preventing any undesirable deformation, may be carried out by polymerization at the edge during the cutting out operation. The reaction is initiated by the freshly cut alkali metal.

According to another embodiment of the invention, part of the cut out battery is folded on itself to contain an odd number of basic battery units each bent in zigzag, and the assembly is terminated with faces having opposite polarities. The batteries may also be superposed so as to produce an infinite number of assemblies in parallel or in series by simple piling, or the batteries individually cut out or in group may be placed in a single case by using the external faces of the batteries and of the assemblies to ensure current collection.

The invention also concerns a thin polymer electrolyte battery consisting of a superposition of a cathode in the form of a thin film a polymer electrolyte as well as a sheet of a lithium or sodium base anode, characterized in that it is obtained by cutting out said superposition so that its ends be uniformly sliced after said cutting out, and are optionally provided with a thin film obtained by reaction of a reactive lubricant during said cutting out, which consolidates and electrically insulates the edge, said battery maintaining substantially the same voltage once it has been produced than that of a mother-battery used for its production by cutting out.

BRIEF DESCRIPTION OF DRAWINGS

Other characteristics and advantages of the invention will appear from preferred embodiments illustrated in the annexed drawings, given only by way of illustration, but without limitations and in which.

FIG. 2(a) is a schematic illustration in cross-section of an example a battery mechanically cut out by stamping;

FIG. 2(b) is a schematic illustration in cross-section of another example of a battery cut out by stamping;

FIG. 2(c) is a schematic illustration in cross-section of a third example of a battery mechanically cut out by stamping;

DESCRIPTION OF PREFERRED EMBODIMENTS

Figure 1:
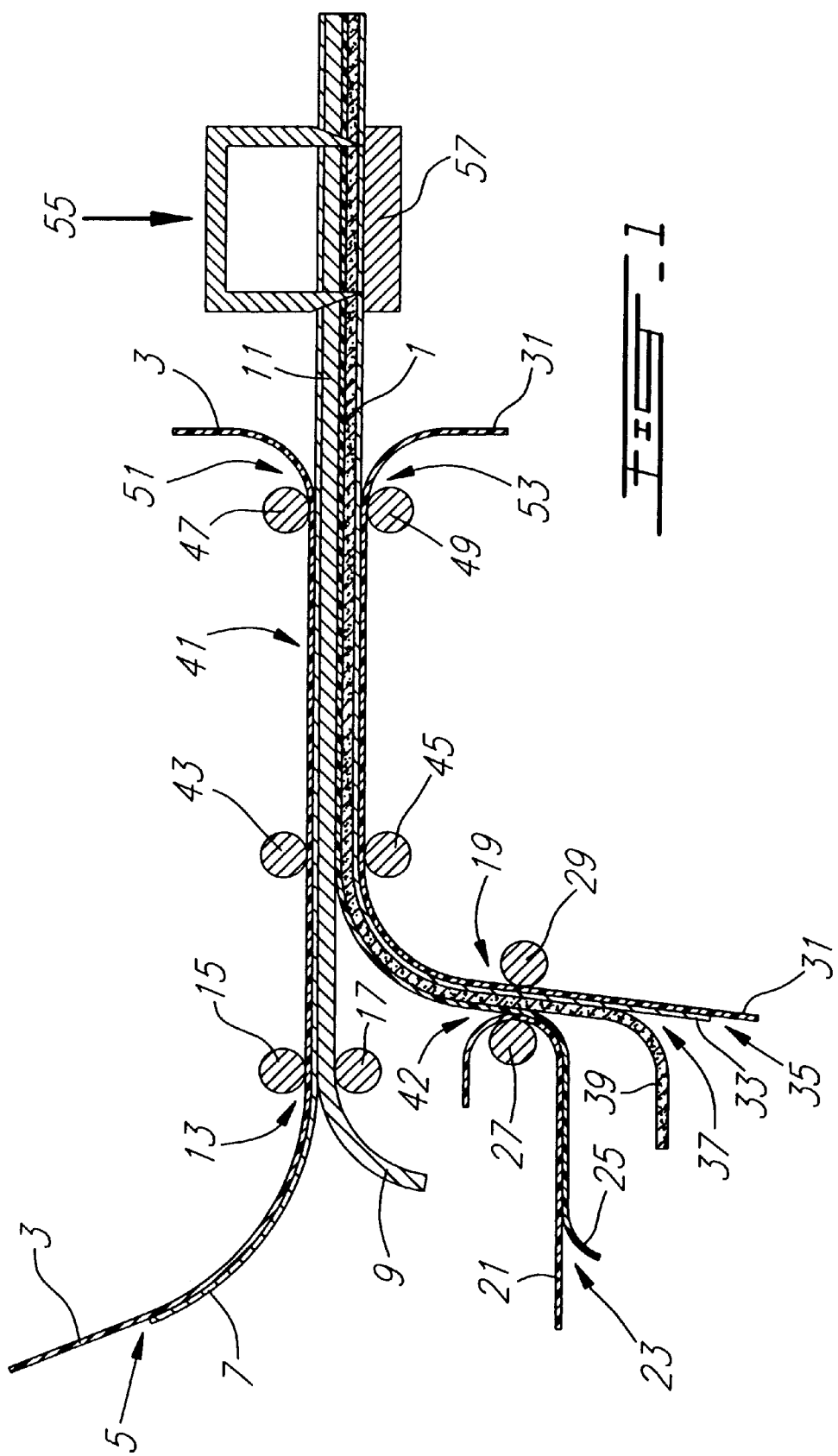
FIG. 1 is a schematic illustration of a process of manufacturing the laminated mother-battery and of cutting out batteries according to the invention.

With particular reference to FIG. 1, given by way of non limiting illustration, it will be seen that the production of a laminated battery of large surface area 1 is carried out by a continuous process as illustrated.. The laminating device illustrated is supplied with a polypropylene film 3 about 20 $\mu$m thick previously treated by metallization/plating with nickel at 5 in a manner well known in the art (U.S. Pat. No. 5,423,974) and at a thickness lower than about 5 $\mu$m, so as to coat the polypropylene film 3 with a peelable layer of nickel 7 having a thickness of 2 gm. On the other hand the laminating device is supplied with a film 9 of a thickness between about 10 and 30 $\mu$m mainly comprising metallic lithium and intended to constitute anode 11 of the laminated mother-battery of large surface area 1.

The polypropylene film 3 covered with a peelable layer of nickel 7, as well as the film of lithium 9 are introduced into rolling-mill 13 comprising cylinders 15 and 17 which rotate in opposite direction and between which lamination Ni₀/Li₀ will take place.

On the other hand, a second rolling-mill 19 which is also part of the laminating device is supplied with another polypropylene film 21 which is coated at 23 in know manner, with a polymer electrolyte film 25, whose thickness may vary between about 5 and 30 $\mu$m, before introducing it into rolling-mill 19 between cylinders 27 and 29. Of course a gelled polymer electrolyte could also very well be used without departing from the scope of the invention.

A third propylene film 31 is simultaneously supplied to rolling-mill 19, however it is previously coated at 35, with a layer of nickel 33 of a thickness lower than about 5 $\mu$m, by means of a step of metallization/plating well known to one skilled in the art. Before introducing it into rolling-mill 19 and after having been coated with nickel at a thickness of 2 $\mu$m, the film of polypropylene coated with nickel is coated at 37 with a film of cathode 39. The polypropylene film 31, coated with nickel 33 and covered with cathode 39, is then introduced into rolling-mill 19 simultaneously as the polypropylene films 21 coated with electrolyte 25. Lamination product Ni₀/Li₀ obtained at 13 and the one consisting of the laminate polypropylene —electrolyte—cathode are introduced into rolling-mill 41 comprising cylinders 43, 45 and 47, 49, however the polypropylene film 21 was previously peeled off at 42. At the output of rolling-mill 41, support-film 3 is peeled off at 51, and support film 31 is peeled off at 53, and there is obtained a laminated mother-battery of large surface area in which the anode mainly consists of metallic lithium, the separator consists of gelled or non gelled polymer electrolyte, and the cathode comprises a composite material bound by a gelled or non gelled polymer electrolyte; the anode is covered with a thin conductive coating, which is inert with respect to lithium such as, by way of example, metallic nickel; the composite cathode also includes a conductive inert. The external conductive coatings are selected thin, preferable thinner than 5 μm, so that their thickness is negligible with respect to the thickness of the sum of the other components of the laminate and to keep the assembly flexible and easy to handle. These conductive coatings are preferably inert towards the electrodes with which they are in contact in order to ensure the quality of the electrical contacts. The term inert conductive coating means materials which are chemically and electrochemically stable with the active material of the corresponding electrode. Alternately, these coatings may be more or less adhesive so as to facilitate the positioning of individual or multiple cut out batteries when mounting them in a complete generator. The various components of the laminated battery are welded together, however the assembly preserves some flexibility due to the plastic nature of lithium, of the polymer electrolyte and the thin conductive coatings. It will be noted that the operations of peeling indicated on FIG. 1 are carried out before the step of cutting out and placing in a case of the laminated battery.

The sharp cutting out of laminated mother-battery 1 is carried with mechanical means schematically illustrated at 55, so as to give batteries of smaller surface areas 57. In known manner, narrow bands transverse to the laminated battery, or small elements completely cut out along their periphery, or perforated or hollowed elements or of various forms as a function of certain applications in the field of micro-electronics, could also be obtained in known manner. If necessary, a minimum amount of time will be allowed to allow the batteries to completely self-healed and stabilize in voltage so as to enable a quality control of all the elements of the batteries.

FIGS. 2(a), 2(b) and 2(c) illustrate the effect of the cutting out operation on the edges of the battery which become inaccessible for lateral connections. Only the external faces then become accessible for connection. To facilitate these contacts, such as on the side of the anode (oxidation of Li○), there is used a thin inert conductive coating which ensures the quality of the electrical contact and physically insulate the material of the electrode from the other batteries or the material used for wrapping up the batteries. In a non limiting way, two types of coatings are illustrated in FIGS. 2(a), 2(b) and 2(c): a thin metallic coating, in this case a nickel 2 μm thick, and two examples of composite coatings. One of them consists of carbon and an inert and non-conductive binder which is stable during oxidation such as EPDM, PVDF or PVDF-HFP and which is used at the cathode. The other consists of a boron nitride powder which is a metallic conductor, and a binder which is stable under reducing conditions such as EPDM and is used at the anode. Various compounds which are conductive and inert towards lithium may satisfy the above two requirements, such as metallic carbides, nitrides and borides, for example. The term compounds which are inert towards lithium means materials which are chemically and electrochemically stable with respect to lithium. In some cases, it is preferred to limit die lateral conductivity of the positive composite and of its conductive composite coating so as to limit the temporary short-circuit current produced during the cutting out operation, for example in the mother-laminate of large surface area in order to maintain a state of charge and for reasons of security when the thus cut out batteries are optimized for large discharge outputs.

Figure 3C:
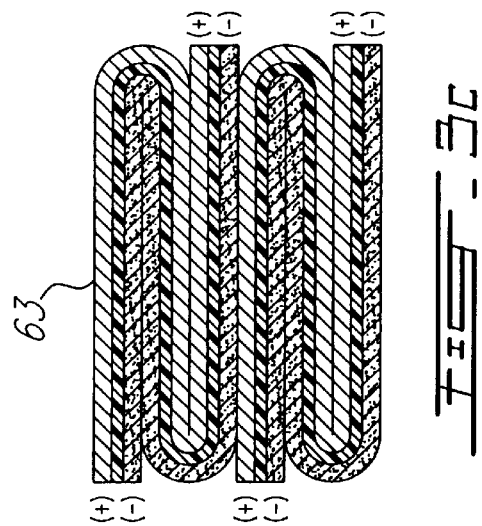
FIG. 3(c) is a cross-section view of another battery mounted in series, but this time obtained by superposing parallel batteries according to FIG. 3(a)
Figure 3B:
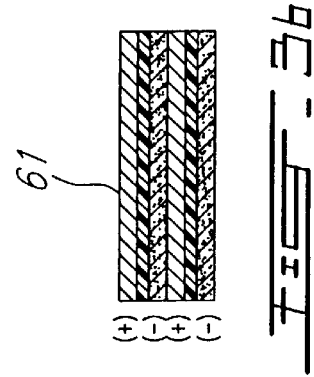
FIG. 3(b) is a cross-section view of a battery mounted in series and obtained by superposing individual batteries according to the invention.
Figure 3A:
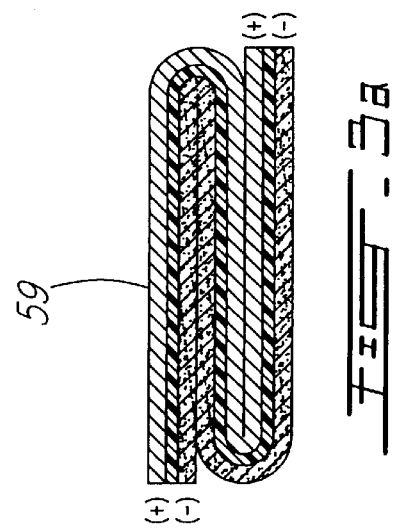
FIG. 3(a) is a cross-section view of a battery according to the invention mounted in parallel and obtained by folding in zigzag.

FIGS. 3(a), 3(b) and 3(c) respectively illustrate the mounting, when required, of individual batteries in parallel 59, by folding in zigzag after cutting out, or in series, by superposing batteries, individual 61 or mounted in parallel 63 in order to increase the voltage of the battery. The conductive coatings of the electrodes ensure electrical contacts between the units, as illustrate, by way of example, in FIGS. 3(a), 3(b) and 3(c).

Mounting of series/parallel batteries or groups of batteries in a single case is made possible because all the components are in solid state or without excess of solvent in the case of gelled systems which prevents local corrosion effects for example for mounting in series. Sealing of the electrochemical assembly and of the wrapping materials is carried by using, if required barrier metallic materials as collector of the whole of the electrochemical device. Alternately, the adhesiveness of the conductive coatings of the electrodes will be relied upon to ensure the positioning of the battery or batteries in the case.

Figure 4:
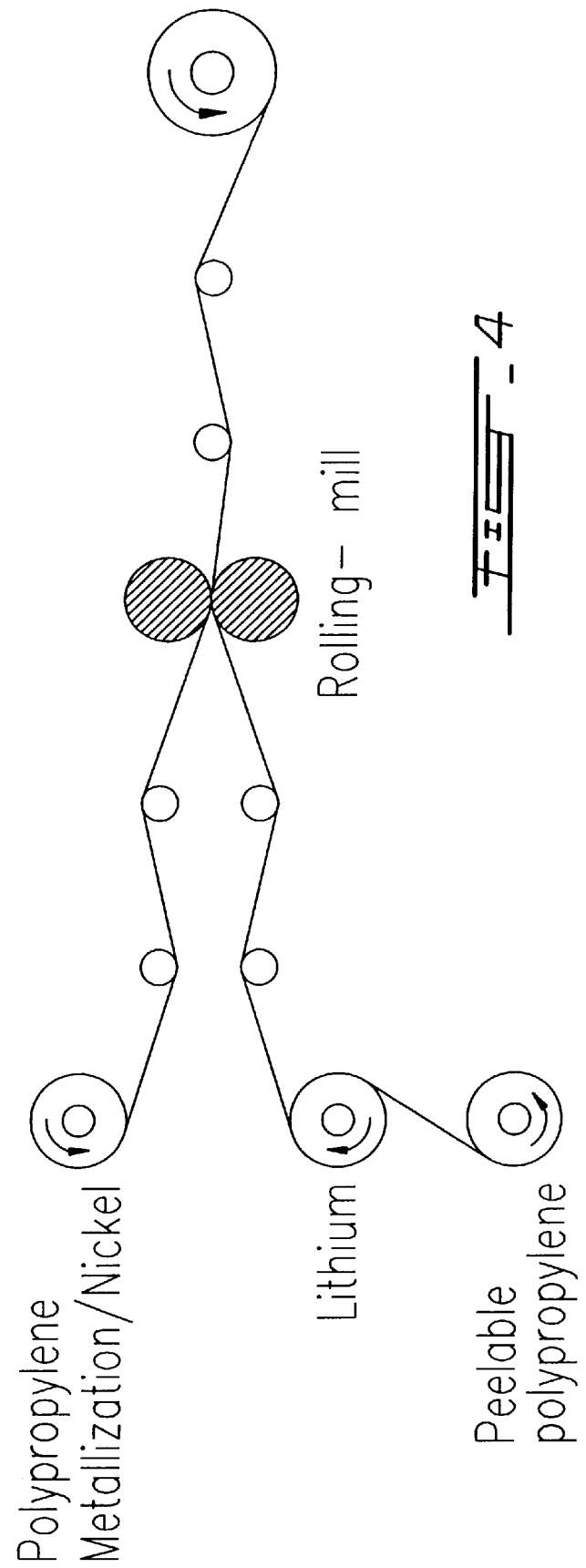
FIG. 4 is a schematic illustration of a process of manufacture of Li₀ and it nickel coating.

Referring to FIGS. 4 to 9, it will be seen, more particularly in FIG. 4, how to produce a conductive nickel coating which adheres to a thin sheet of lithium, the assembly being obtained by lamination of a sheet of lithium supported on plastic as described in U.S. Pat. No. 5,423,974 and 5,521,028 with a thin sheet of nickel 2 μm thick on a peelable plastic support.

Figure 5:
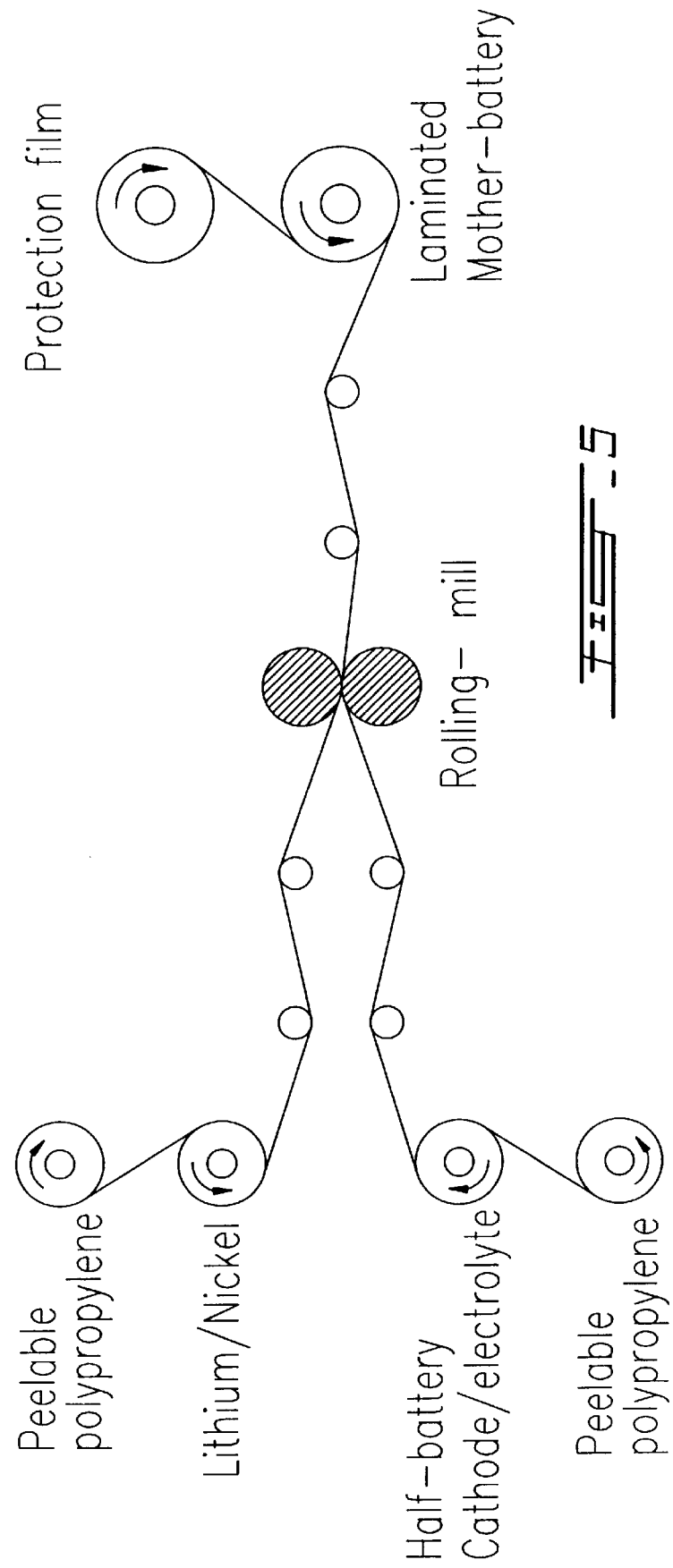
FIG. 5 is a schematic illustration of an example of a process of laminating the laminated mother-battery.

The manner of obtaining the laminated battery by a continuous process from a half-battery: Cathode/Polymer Electrolyte by transfer is illustrated in FIG. 5.

Figure 6:
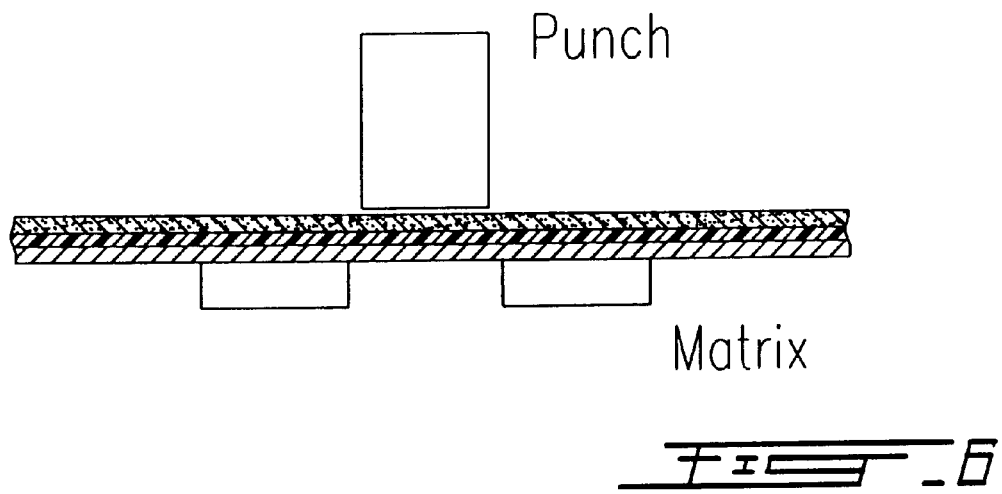
FIG. 6 is a schematic illustration in cross-section of the process of cutting out batteries according to the invention by stamping out.

The manner of cutting out batteries of small surface areas from the laminated battery by means of a stamp is illustrated in FIG. 6.

Figure 7:
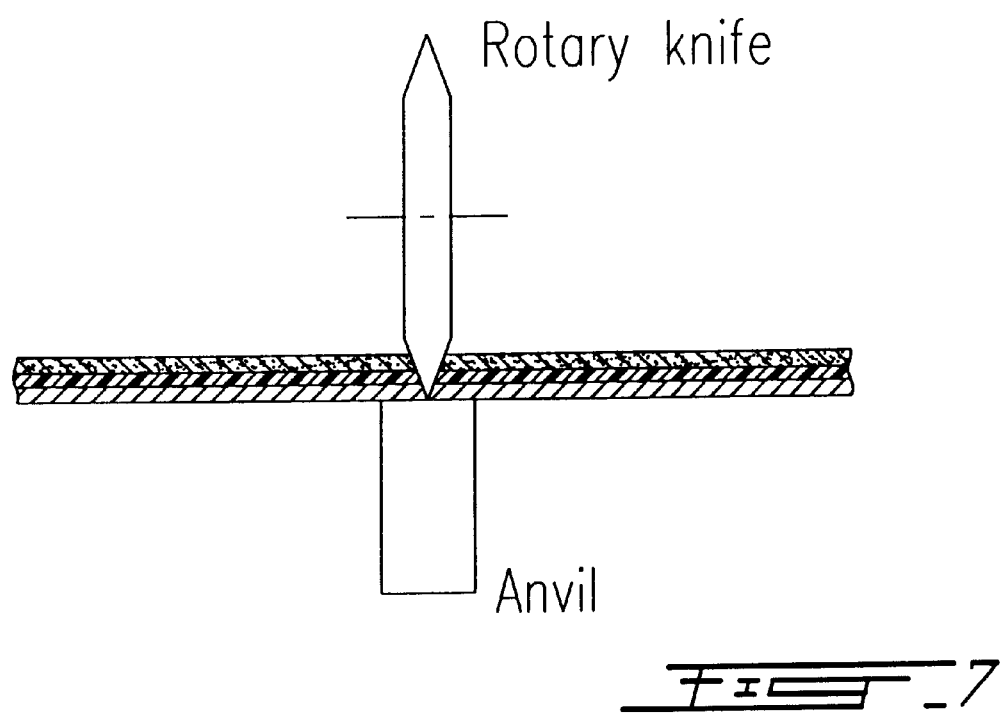
FIG. 7 is a schematic illustration in cross-section of the process of cutting out batteries according to the invention in narrow bands.

The manner of cutting out batteries into narrow bands from the laminated battery by means of a rotary knife is illustrated in FIG. 7.

Figure 8:
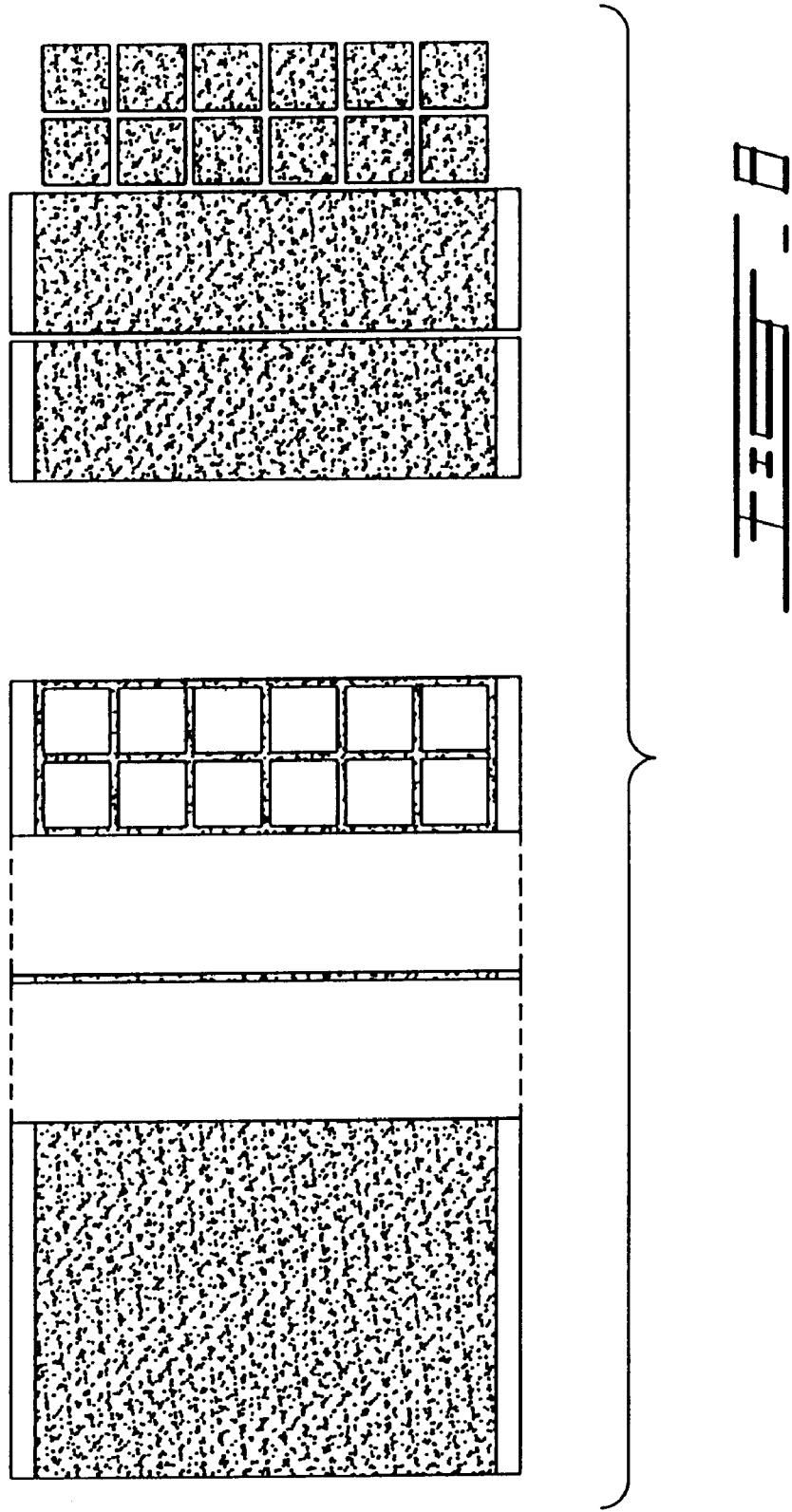
FIG. 8 is a schematic illustration taken from above of a laminated mother-battery after cutting out on the one hand by stamping out and on the other hand with a rotary knife and of small batteries and narrow bands respectively according to the invention.

Examples of battery shapes cut out from the mother-laminate obtained by stamping out or with a rotary knife are illustrated in FIG. 8.

Figure 9B:
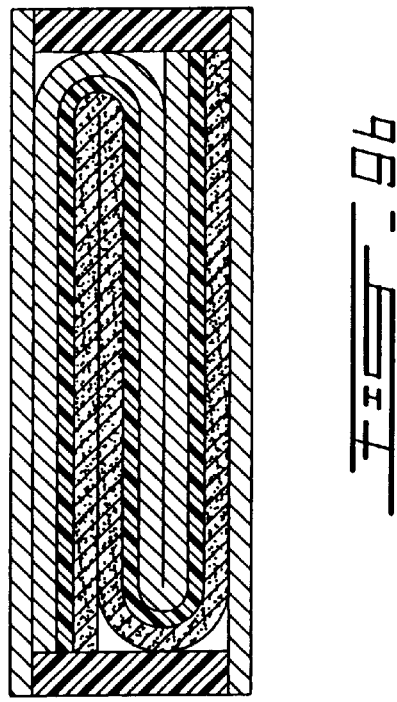
FIG. 9(b) is a cross-section view of a wrapped up battery according to FIG. 3(a) with unitary voltage.
Figure 9A:
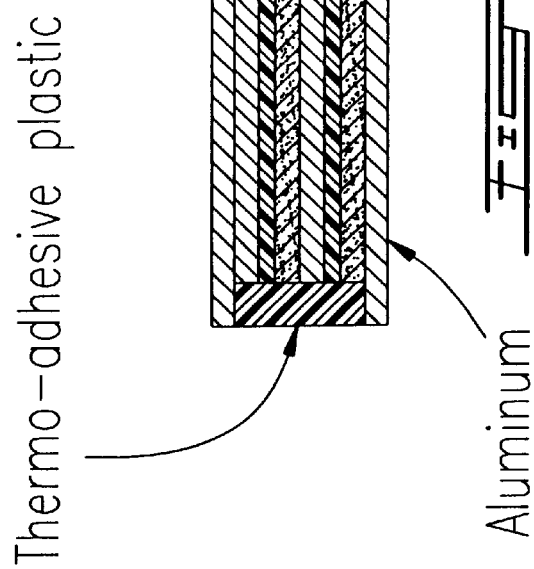
FIG. 9(a) is a cross section view of a wrapped up battery according to FIG. 3(b) with multiple voltage.

The manner of piling up in series, unitary batteries or batteries mounted in zigzag when it is intended to develop an effective surface larger than the one of the wrapped up battery and to obtain a multiple voltage from a unitary cell is illustrated in FIGS. 8 and 9.

Examples of wrapped up batteries with unitary voltage and multiple voltage are illustrated in FIG. 9.

The active material of the cathode may be selected from cobalt oxide, nickel oxide, nickel cobalt oxide, nickel cobalt aluminum oxide, manganese oxide ($LiMn_2O_4$) or analogues thereof for so called 4V cathodes; for cathodes of less than 4V the active material may be chosen from phosphates or other polyanions of transition metals such as $LiFePO_4$, Nasicons structures also including $V_2O_5$, $LiV_3O_8$ and $MnO_2$, chalcogenides, oxocarbonates such as rhodizonate, and halides such as monofluorinated carbons $(CF)_n$, The nature of the active material of the cathode is not a limitation of the present invention.

The electrolytic component may consist either of a copolymer of ethylene oxide as described in U.S. Pat. Nos. 4,578,326 and 4,758,483 in which at least one alkaline salt is dissolved and which may or may not contain polar aprotic solvents, or a gel formed of a polymer which is not a good solvent of lithium salts or is a low intrinsic conductor in the presence of salts but including heteroatoms such as fluorine or polar groups such as nitriles, sulfonates, fluoromethanes, which make them miscible with one or a plurality of polar aprotic organic solvents. These then give to the gel solving properties of lithium salts so as to enable them to act as electrolytic component. The main polymers with low solving properties may be, by way of non limiting example, PVDF or their copolymers, polyacrylonitriles and polyelectrolytes including sulfonate or fluorosulfonate groups or their equivalents. The nature of the electrolytic component is not a limitation of the present invention.

The cathode may also contain a binder which is inert towards the material of the electrode and die aprotic solvent, for example in a non limiting manner, EPDM. The nature of the binder is not a limitation of the present invention.

The active material of the anode may be selected from lithium metal, sodium metal or an alloy thereof. As used herein, the term alloy means a mixture containing a major fraction of the alkali metals with one or more other components, in a manner that during the cutting out operation, the chemical or electrochemical reaction of the alkali metal with the cathode be sufficient to permit self-healing. The nature of the active material is not a limitation of the present invention.

The alkali salt or salts may be lithium, sodium, potassium or other salts, such as for example salts based on lithium trifluoromethanesulfonimide described in U.S. Pat. No. 4,505,997, lithium salts derived from bisperhalogenoacyl or sulfonylimide, which are cross-Linkable or not and are described in U.S. Pat. No. 4,818,644 and in PCT WO 92/02966, $LiPF_6$, $LiBF_4$, $LiSO_3CF_3$, $LiClO_4$, LiSCN, NaSCN, $NaClO_4$, KSCN and $KClO_4$, etc. The nature of the salt is not a limitation of the present invention.

For a gelled system, the polar aprotic solvent or solvents may be selected by way of example from propylene carbonate, ethylene carbonate, ethyl methyl carbonate, dimethyl carbonate, diethyl carbonate, tetrehydrofurane, 2-methyultetrahydrofurane, dioxolane, 2,2-dimethyl-1,3-dioxolane, γ-butyrolactone, butylene carbonate, sulfolane, 3-methylsulfolane, tert-butyl-ether, 1,2-dimethoxyethane, 1,2-diethoxyethane, bis(methoxyethyl)ether, 1,2-ethoxynethoxyethane, tert-butylmethylether, glymes and sulfamides of formula $R_1R_2N—SO_2—NR_3R_4$, in which $R_1$, $R_2$, $R_3$ and $R_4$ are alkyls comprising between 1 and 6 carbon atoms and/or oxyalyl groups comprising between 1 and 6 carbon atoms. The nature of the solvent is not a limitation of the present invention.

Advantages of the Invention

The advantages of the invention are multiple whether on the point of view of a simplification of the manufacturing processes or on the point of view of the optinization of the electrochemical performances and the designs obtained.

The invention uses a laminated mother-battery produced as a continuous band by means of coating and transfer processes which does not require specific zone to facilitate the cutting out operation: masked zones, coating with electrode and electrolyte design, transfer of discontinuous elements such as sheets of lithium, absence of recessed zones on the collector in the case where the latter is also used as wrapping and support material during sealing. The production of the mother-battery is therefore simple and rapid and causes no important reject during the cutting out operation.

The use of electronic conductive coatings, which are thin and chemically inert with respect to the electrodes enables to optimize the massic and volumic energy in spite of the superposition of the coatings when the batteries are folded in zigzag, facilitates the cutting out operation and physically separates the reactive electrodes from the walls of the wrapping while enabling electrical contacts which are stable in time.

The self-healing properties of lithium established in this invention enable a rapid production of batteries having desired shape by mechanical cutting out of the laminated mother-battery with a reject yield which very low or nil. The reliability of the process in use is such that it is thus possible to manufacture rechargeable batteries. It is also demonstrated that it is possible to completely neutralize the cutting zone par chemical reaction of lithium present at cutting edge with gases or solvents which are reactive towards lithium. It is also shown that it is possible to consolidate the edge during chemical reaction of lithium.

The use of a temporary and peelable plastic support during preparation of the electrodes which are used at the start to manufacture the laminated mother-battery facilitates the handling of the laminated battery until the cutting out operation and insertion into a case.

The combination of the properties of flexibility of the cut out battery, the solid state of the electrolyte and the thinness of the conductive coatings enable to manufacture in the same case an infinity of parallelseries series combinations and to develop the surface in use and the voltage of the assembly to conform the performances of the generator to a large number of applications from a single laminated mother-battery.

For primary batteries composed of manganese dioxide ($MnO_2$), the weak discharge resulting from the mechanical cut out enables to eliminate or to reduce the step of discharge by 2 to 10% normally carried out in order to increase the length of storage of this type of battery as described in U.S. Pat. No. 4,328,288.

EXAMPLES

The invention will now be illustrated by the non limiting examples which follow.

Example 1

From a laminate as illustrated in FIG. 5, a sample is provided of 12 batteries of circular shape by means of a laboratory type of stamping tool. Handling was carried in a glove box under an inert atmosphere of argon. The relative humidity was lower than 1 ppm and the amount of oxygen was lower than 10 ppm. The laminate comprises tie following elements:

Ni○ (2 μm)/Li○ (24 μm)/Polymer Electrolyte (30 μm)/ Composite Cathode (45 μm)/Al (13 μm).

The staring laminate is obtained by continuously coating the cathode on its collector and the electrolyte on a peelable support followed by a transfer while hot of the electrolyte on the cathode and peeling of the temporary support; the anode of lithium and its nickel collector as obtained in FIG. 4 is thereafter transferred. The composite cathode comprises vanadium oxide, carbon black and a polymer electrolyte as binder. The polymer electrolyte which also serves as separator consists of a copolymer of ethylene oxide in which a salt of lithium, $(CF_3SO_2)2NLi$, is dissolved in a ratio O/Li of 30/1. U.S. Pat. Nos. 4,578,326 and 4,758,483 describe non-limiting examples of copolymers which can be used in the process of the invention. These copolymers may be cross-liked if required, by means known to one skilled in the art.

Figure 10:
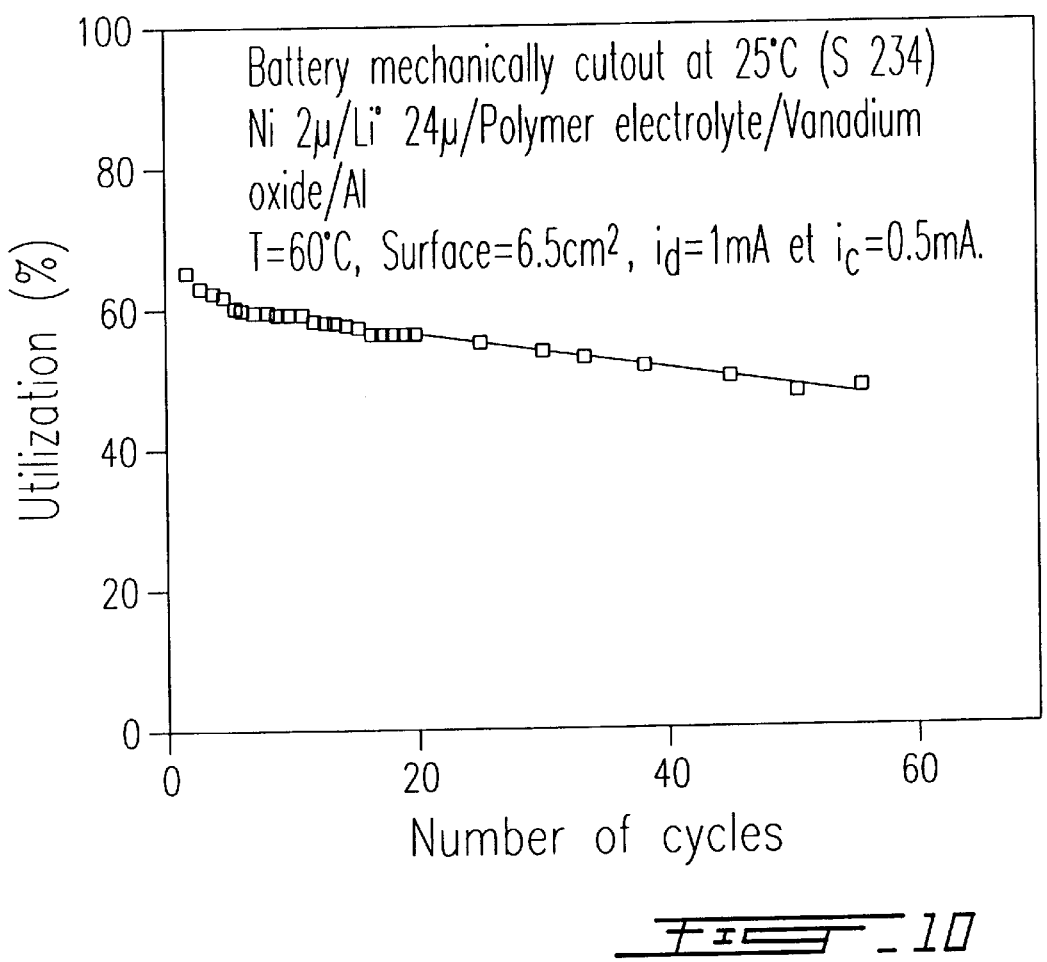
FIG. 10 is a curve in percent versus number of cycles of the use of a mechanically cut out battery, at 25° C. according to the invention.

The values obtained after cutting out at 25° C. under inert atmosphere of the 12 batteries are given in TABLE I. It can be observed that the amount of reject is very low and that the batteries kept at room temperature have a voltage which is very similar to that of the starting laminate. The mother-laminate also has a voltage higher than 3.3 volts after cutting out (TABLE I) indicating that it has also recovered its origiaal value, through a phenomenon of self-healing. In FIG. 10, the curve of cycling of the first cut out battery is used to illustrate the value of the process of cutting out/ healing of the invention by subjecting the battery of 7.7 C/cm$^2$ and a surface of 6.5 cm$^2$ to a repeating cycling at 60° C. under constant current and between the limits of 3.3 and 1.5 volts. This cycling test under inert atmosphere may be considered as an extreme test to locate the weak points produced by the mechanical cut out operation and which would be revealed during successive cycles of discharge/ charge.

The behavior in cycling is exactly identical to the behavior in cycling of the stating non sharply cut out laminate when proportionately represented by surface unit. Only a self-healing phenomenon resulting from an electrochemical dissolution of lithium when in contact with the positive electrode enables to explain such result.

TABLE I

| Number of battery cut out under inert atmosphere | Voltage or battery after cutting out (volts) | Voltage of battery 1 hour after cutting out (volts) |
| --- | --- | --- |
| 1 | 3.156 | 3.410 |
| 2 | 3.202 | 3.341 |
| 3 | 3.405 | 3.433 |
| 4 | 0.001 | 3.016 |
| 5 | 3,.407 | 3.445 |
| 6 | 3.109 | 3.331 |
| 7 | 3.387 | 3.405 |
| 8 | 3.201 | 3.295 |
| 9 | 0.003 | 3.105 |
| 10 | 2.797 | 3.204 |
| 11 | 3.388 | 3.424 |
| 12 | 3.316 | 3.410 |
| mother laminate | 2.697 | 3.322 |

Example 2

Example 1 is reproduced, this time by replacing the cathode with a second film of lithium. The thus produced laminate includes the following elements:

Ni○ (2 μm)/Li○ (24 μm)/Polymer Electrolyte (20 μm)// Li○(24 μm)/Ni○(2 μm).

Before the cutting out operation, an impedance measurement shows an interface resistance of 30 Ω/cm$^2$ for the laminated mother-battery. From this laminate, a sample is taken, in a glove box under an inert atmosphere of argon, of five batteries of circular shape by means of a stamping tool. An impedance measurement of each of these batteries immediately after the cutting out operation shows that the battery is in short-circuit After 24 hours, a second impedance measurement is carried out, and the five batteries are always in short-circuit showing that the battery cannot self-heal without a reaction of lithium with the active component of the cathode. Under inert atmosphere, the absence of an element which is reactive towards lithium does not produce a healing at the edge. A battery is thereafter treated with a solution of ethyl alcohol in order to heal the edge, After this treatment, an impedance measurement is made which shows that the short-circuit has been eliminated, and that the battery then has an impedance similar to the one obtained for the laminated mother-battery.

Example 3

From the elements illustrated in FIGS. 4 to 6, 24 individuals batteries are cut out in rectangular shape by stamping and the voltage of each battery is controlled. Handling is carried out in an anhydrous chamber having a relative humidity of 120 ppm. The values found for the batteries are indicated in TABLE II. Two cases, are studied. In the first case, the cutting out operation is carried at room temperature (TABLE II, batteries 1 to 12); in the second case, the laminate battery is previously cooled with liquid nitrogen before introducing it in the stamping tool (TABLE II, batteries 13 to 24), so as to harden the electrolyte at a temperature lower than its glass transition temperature during cutting out and by the same token reducing the ionic conductivity. The results are substantially the same in both cases. It will be noted however that in the case of batteries handled cold (TABLE II, batteries 13 to 24, no true short-circuit was noted. It can be noted that the rate of reject is very low and that the batteries kept at room temperature have a voltage which is very similar to that of the starting laminate. The laminate comprises the following elements:

Ni○ (2 μm)/Li○ (24 μm)/Polymer Electrolyte (15 μm)/ Composite Cathode (40 μm)/Al (13 μm).

The composite cathode comprises vanadium oxide, carbon black and a polymer electrolyte as binder. The polymer electrolyte which is also used as separator consists of a copolymer of ethylene oxide in which a salt of lithium, (CF$_3$SO$_2$)$_2$NLi, is dissolved in a ratio O/Li of 30/1. U.S. Pat. Nos. 4,578,326 and 4,758,483 describe non-limiting examples of copolymers which can be used in the process of the invention. These copolymers may be cross-linked, if required, by means known to one skilled in the art.

When a battery is accidentally placed in short-circuit, it is noted that this battery substantially recovers its initial voltage in the seconds which follow. Cutting out being carried out under anhydrous condition this voltage recovery is mainly explained by a phenomenon of self-healing of lithium which seems to result from the electrochemical dissolution of the latter when in contact with the positive electrode.

TABLE II

| Number of cut out battery | Voltage of battery after cutting out (volts) | Voltage of battery 1 hour after cutting out (volts) |
| --- | --- | --- |
| 1 | 3.269 | 3.390 |
| 2 | 0.002 | 3.034 |
| 3 | 3.411 | 3.432 |
| 4 | 3.425 | 3.446 |
| 5 | 3.340 | 3.385 |
| 6 | 3.409 | 3.431 |
| 7 | 3.407 | 3.435 |
| 8 | 0.001 | 3.215 |
| 9 | 2.703 | 3.137 |
| 10 | 3.397 | 3.410 |
| 11 | 0.000 | 3.144 |
| 12 | 3.387 | 3.422 |
| 13 | 2.613 | 2.934 |
| 14 | 3.396 | 3.420 |
| 15 | 3.356 | 3.387 |
| 16 | 3.374 | 3.415 |
| 17 | 3.414 | 3.439 |
| 18 | 3.328 | 3.382 |
| 19 | 2.760 | 3.251 |
| 20 | 3.321 | 3.378 |
| 21 | 2.807 | 3.278 |
| 22 | 2.733 | 3.259 |
| 23 | 3.301 | 3.54 |
| 24 | 2.788 | 3.97 |

Example 4

Example 3 is reproduced in an anhydrous chamber this time utilizing a gelled polymer electrolyte obtained by irradiating with an electron beam, EB, at a dose of 5 Mrad. The electrolyte comprises in volume 50% of glycerol-tri [polyethylene)(oxypropylene)] triacrylate and 50% of a mixture of salted polar aprotic solvent consisting of ethyl methyl carbonate and ethylene carbonate (in a volume ratio of 1:1) and lithium hexafluorophosphate at a 1 molar concentration (available from Tomiyama). The gelled polymer electrolyte obtained has a good ionic conductivity at 25° C. and mechanical properties which are sufficient to serve as separator in the battery.

The results obtained are substantially identical to those of the preceding example, in spite of the presence of a liquid plasticizing agent. The presence of a plasticizing solvent should facilitate the healing of the edge.

Example 5

Starting from a laminate as described in example 1, five circular batteries are cut out under inert atmosphere using a laboratory stamping tool. The laminate comprises the following elements:

Ni○ (2 μm)/Li○ (24 μm)/Polymer Electrolyte (30 μm/Composite Cathode (45 μm)/Al (13 μm).

During the cutting out operation the slice of the stamping out tool is lubricated with ethyl alcohol, the latter rapidly oxidizing the lithium of the edge of the battery into an electronically non conductive compound. The values of the voltage obtained for the five cut out batteries are substantially the same and are about 3.34 volts.

Ethyl alcohol is used in the present example, however other reactive liquids or gases may also be used depending on the nature of the oxidized compound that is intended to be obtained to ensure a good operation of the generator.

Example 6

The present example concerns a cutting out of two batteries which are identical to those described in example 5 except that the slice of the stamping tool is lubricated with a solution of toluene containing in volume 40% of a mixture of monomers consisting of 40% pentaerythritol tetraacrylate and 60% of methyl methactylate (available from Polysciences). During the cutting out operation, exposing metallic lithium to said solution initiates a polymerization reaction which forms a thin film, which is hard and electrically insulating and mechanically consolidates the edge of the battery. After cutting out the two batteries have a voltage of 3.33 volts, The consolidation of the edge was verified from a test of mechanical penetration. The measurement device consist of a point 7 mm in diameter under thrust of 240 g. For each battery in which the total thickness is 114 μm, a first penetration measurement was taken at the center of the battery and a second measurement on the edge. TABLE III shows variations of penetration in percent noted during this test.

TABLE III

|  | Penetration at center of battery | Penetration at edge of battery |
| --- | --- | --- |
| Battery 1 | 10% | 8% |
| Battery 2 | 10% | 7% |

It is understood that modifications are possible within the spirit and scope of the invention as defined in the appended claims.

We claim:

1. Process of preparing tin gelled or non gelled polymer electrolyte batteries with lithium or sodium base anode, from a laminated mother-battery of large surface area containing a lithium or sodium base anode sheet, a polymer electrolyte as well as a cathode in the form of thin film, characterized in that said cathode has the property of dissolving lithium or sodium, and subjecting the mother-battery to a sharp mechanical cut off in a manner to involve a phenomenon of self-healing.

2. Process according to claim 1, characterized in that self-healing results from a chemical dissolution in said cathode of all lithium or sodium having been in contact with said cathode during the cutting out operation.

3. Process according to claim 1, characterized in the anode is based on metallic lithium.

4. Process according to claim 1, characterized in that the polymer electrolyte is conductive of alkaline ions and acts as separator between the anode and the cathode.

5. Process according to claim 1, characterized in that the mother-battery includes a compound which is reducible to lithium or sodium, an additive of electronic conduction and a polymer electrolyte binder.

6. Process according to claim 1, characterized in that there is provided a thin electronically conductive coating on the external face of the anode and optionally of the cathode, in which the conductive material is chemically inert towards the material of the electrode and also serves to establish permanent electrical contacts on the external faces of the cut out batteries.

7. Process according to claim 1, further comprising the process steps of forming the mother battery from continuous films of anode, cathode and polymer electrolyte, which are assembled by processes of coating and transfer of films, said films adhering to one another.

8. Process according to claim 1, characterized in that the obtained batteries are piled over one another, in parallel or in series.

9. Process according to claim 8, characterized in that the batteries are folded and thereafter piled over one another.

10. Process according to claim 1 or 8, characterized in that individual batteries, or batteries piled over one another in parallel or in series are placed in a single case.

11. Process according to claim 10, characterized in that the electrical connection of the thin batteries consists of the external faces of individual or assembled batteries.

12. Process according to claim 6, characterized in that the thickness of the conductive coating of the anode and optionally of the cathode is lower than 5 micrometers so as to minimize the weight and the volume and to preserve the flexibility of the thin battery as a whole.

13. Process according to claim 6, characterized in that the conductive coating is a thin metallic sheet based on nickel or iron.

14. Process according to claim 6, characterized in that the conductive coating is a composite including an inert polymer binder and an electronically conductive charge dispersed with respect to the electrode material, the conductive coating being stable towards the active material of the corresponding electrode.

15. Process according to claim 14, characterized in that the conductive charge is a conductive powder which is inert towards lithium and comprises metallic nitrides, carbides and borides.

16. Process according to claim 14, characterized in that the conductive charge comprises carbon when utilized to coat the cathode.

17. Process according to claim 14, characterized in that the inert polymer binder is a non ionic conductor selected from the group consisting of ethylene and propylene monomer units including polyethylene, polypropylene or EPDM or monomeric urethane units including polyurethane.

18. Process according to claim 14, characterized in that the inert polymer binder is a non ionic conductor and consists of a cross-linkable prepolymer.

19. Process according to claim 18, characterized in that the cross-linkable prepolymer has functional groups and is selected from acrylates, methacrylates, allyls and vinyls.

20. Process according to claim 17, characterized in that in the case of the cathode, the inert polymer binder also comprises fluorinated units including PVDF and copolymers thereof.

21. Process according to one of claims 14 to 20, characterized in that the inert polymer binder is a adhesive, so as to facilitate positioning of the batteries and the quality of electrical contacts.

22. Process according to claim 21, characterized in that the inert polymer binder comprises a thermo-adhesive compound.

23. Process according to claim 13, characterized in that the composite conductive coating has a surface resistance which varies between 0.1 and 1000 $\Omega/cm^2$ so as to limit a short-circuit during cutting out, in order to maintain a state of charge and for security of cutting out operations.

24. Process according to claim 23, characterized in that the surface resistance varies between 1 and 300 $\Omega/cm^2$.

25. Process according to claim 1, characterized in that the laminated mother-battery comprises a peelable support film on at least one of its faces so as to facilitate its production and handling.

26. Process according to claim 25, characterized in that the peelable support film selected from the group consisting of polypropylene or polyethylene.

27. Process according to claim 25, characterized in that the peelable support is removed immediately before the operation of cutting out the battery.

28. Process according to claim 1, further comprising the process steps of forming laminated mother battery by a process of coating and transfer and that it comprises if necessary steps of cross-linking before or after transfer of the films.

29. Process according to claim 4, characterized in that the polymer electrolyte of the separator optionally of the electrode consists of a product of molecular weight higher than 50,000 so as to obtain films which can be handled and transferred by continuous laminating processes.

30. Process according to claim 1, further comprising gelling the polymer electrolyte by adding polar aprotic liquid solvents so as to optimize ionic conductivity at room temperature.

31. Process according to claim 1, characterized in that the laminated mother-battery is cooled, before cutting out, at a temperature lower than the glass temperature of the electrolyte so as to reduce ionic conductivity during the cutting out operation.

32. Process according to claim 1, characterized in that the polymer electrolyte consists of a polymer matrix and the latter is made conductive by adding a soluble alkaline metal salt in the electrolyte.

33. Process according to claim 1, characterized in that the polymer electrolyte consists of a polymer matrix and the latter is made conductive by adding at least one polar aprotic solvent thereto.

34. Process according to claim 33, characterized in that the addition of a polar aprotic liquid solvent is carried after the cutting out operation so as to minimize a short-circuit current during the cutting out operation.

35. Process according to claim 1 or 32, characterized in that an alkaline salt is added after the cutting out operation so as to minimize a short-circuit current.

36. Process according to one of claims 30, 32 to 35, characterized in that the addition of polar aprotic solvents or salt or both is facilitated by using at least one permeable composite conductive coating in order to facilitate their introduction.

37. Process according to claim 1, characterized in that the mechanical cutting out operation is carried out by means of blanking, crush cutting or score cutting tools.

38. Process according to claim 1, characterized in that the battery is cut out in regular, irregular perforated or hollowed shape.

39. Process according to one of claims 1 to 4, characterized in that the cutting out operation is carried with a tool consisting at least in part of an insulating material so as to minimize short-circuit during the cutting out operation.

40. Process according to claims 37 or 38, characterized in that the cutting out operation is carried in the presence of an inert or reactive lubricant.

41. Process according to claim 1, characterized in that during or after the cutting out operation, lithium or sodium present in the cut out edge is chemically reacted so as to eliminate all short-circuit and to neutralize lateral electrochemical activity.

42. Process according to claim 41, characterized in that the chemical reaction is carried out in the presence of reactives capable of oxidizing the lithium present at the edge, and which are liquids or gases capable of forming an electrically insulating lithium compound which is insoluble in the polymer electrolyte.

43. Process according to claim 42, characterized in that the reactive consists of air.

44. Process according to claim 42, characterized in that the compound formed is based on carbonates, oxyanions, oxides, chalcogenides, fluorine derivatives or alcoholates.

45. Process according to claim 9, characterized in that an odd number of basic units of cut out and folded in zigzag batteries are superposed and the assembly is terminated by external faces having opposite polarities.

46. Process according to claim 45, characterized in that the batteries are superposed so as to effect an infinity of parallel and series mountings simply by piling.

47. Process according to claim 1, characterized in that the batteries cut out individually or in group are placed in a single case by using the external faces of the batteries and of the assemblies to ensure current collection.

48. Process according to claim 10, characterized in that the edges of the cut out battery are consolidated by oxidation of lithium and formation of a non conductive salt so as to prevent any undesirable deformation.

49. Process according to claim 48, characterized in that the edge is consolidated by polymerization reaction initiated by freshly cut lithium.

* * * * *